United States Patent [19]
Noguchi et al.

[11] 4,000,731
[45] Jan. 4, 1977

[54] INTERNAL COMBUSTON ENGINES
[75] Inventors: Masaaki Noguchi, Nagoya; Shougo Sanda, Okazaki, both of Japan
[73] Assignee: Toyota Jidosha Kogyo Kabushiki Kaisha, Toyota, Japan
[22] Filed: Feb. 28, 1975
[21] Appl. No.: 554,236
[30] Foreign Application Priority Data
Sept. 17, 1974 Japan .............................. 49-107337
[52] U.S. Cl. .................. 123/191 S; 123/32 SP; 123/32 ST; 123/191 SP
[51] Int. Cl.² ................... F02B 17/00; F02B 19/18
[58] Field of Search ............ 123/32 C, 32 D, 32 K, 123/32 L, 32 AA, 32 SP, 32 SA, 32 ST, 143 B, 191 S, 191 SP

[56] References Cited
UNITED STATES PATENTS

| | | | |
|---|---|---|---|
| 1,271,942 | 7/1918 | Ricardo | 123/32 ST |
| 2,100,143 | 11/1937 | Mock | 123/32 SA |
| 2,109,298 | 2/1938 | Mock | 123/30 C |
| 2,153,598 | 4/1939 | Steward | 123/191 SP X |
| 3,144,013 | 8/1964 | Peras | 123/32 SA X |
| 3,270,721 | 9/1966 | Hideg | 123/32 ST |
| 3,776,212 | 12/1973 | Karlowitz | 123/32 SP X |

FOREIGN PATENTS OR APPLICATIONS

| | | | |
|---|---|---|---|
| 1,809,199 | 8/1969 | Germany | 123/30 C |

*Primary Examiner*—Charles J. Myhre
*Assistant Examiner*—Tony M. Argenbright
*Attorney, Agent, or Firm*—Cushman, Darby & Cushman

[57] ABSTRACT

An internal combustion engine of the type having a main combustion chamber and an auxiliary combustion or precombustion chamber intercommunicated through a passage with the former for burning a lean fuel-air mixture in order to reduce the harmful emissions. The shape of the main combustion chamber, the intake port and the intake valve are so designed that a substantial portion of the lean mixture may be directed toward the apex of the spherical inner surface of the dome-shaped main combustion chamber an flow therealong so as to form intensive swirls. The opening at the main combustion chambr of the passage intercommunicating the main and auxiliary combustion chambers is so positioned that the relatively rich fuel-air mixture caused by the centrifugal forces of the swirls may be pushed into the auxiliary combustion chamber and that the combustion flame produced in the latter may be injected at high speeds into the downstreams of the swirls in the main combuston chamber, thereby igniting the lean mixture therein.

9 Claims, 5 Drawing Figures

INTERNAL COMBUSTON ENGINES

BACKGROUND OF THE INVENTION

The present invention relates to an improvement of the internal combustion engines of the type in which a relatively lean fuel-air mixture is burnt in order to reduce the contents of the harmful emissions in the exhaust gases.

There has been devised and demonstrated various methods of burning the lean fuel-air mixture, that is, the mixture with a high air-fuel ratio, in internal combustion engines in order to reduce the harmful emissions such as carbon monoxide (CO), hydrocarbons (HC), and nitrogen oxides (NOx) from the exhaust gases. However, the ignitability of the lean fuel-air mixture is, in general, poor, which is especially true when residual gases remain in the vicinity of an ignition plug. Furthermore, the combustion speed of the lean mixture is low, resulting in a poor thermal efficiency of the engine and a high fuel consumption rate (g/horsepower·time) when applied in an automotive engine.

In order to overcome the poor ignitability mentioned above, there have been devised and demonstrated the stratified charge type internal combustion engines in which, in order to ignite the lean fuel-air mixture, a zone of relatively rich mixture, which may be easily ignited, is formed around the spark plug, which is initially ignited by the spark plug and the resulting flame ignites the lean fuel-air mixture.

There have been also proposed internal combustion engines to overcome the low combustion speed, which is provided with an auxiliary combustion chamber of the type in which the main and auxiliary combustion chambers are intercommunicated through a passage. The fuel-air mixture pushed into the auxiliary combustion chamber through the passage during the compression stroke is first ignited, and the resulting combustion flame with both high temperature and pressure is injected from the auxiliary combustion chamber through the passage into the main combustion chamber to ignite the lean fuel-air mixture in the main combustion chamber. The passage intercommunicating between the main and auxiliary combustion chambers is, in general, narrow so that the combustion flame is discharged through the passage into the main combustion chamber at considerably high speeds, by which large portions of the lean mixture contained in the main combustion chamber may be ignited at once. Moreover, intensive turbulence occurs in the main combustion chamber due to the injection of the combustion flame from the auxiliary combustion chamber, by which the speed of combustion in the main combustion chamber can be further improved. This is known as the "torch effect."

In order to improve both the ignitability and combustion speed, that is, to combine the effectiveness of the internal combustion engines of the types described above, there have been devised and demonstrated the stratified charge type internal combustion engine with an auxiliary combustion chamber. In this internal combustion engine, there is provided an auxiliary combustion chamber communicated with a main combustion chamber through a passage. A lean mixture is charged into the main combustion chamber through a main intake valve while the easy-to-ignite rich mixture is charged into the auxiliary combustion chamber through an auxiliary intake valve or formed by the injection of the fuel through a fuel injection valve or nozzle. The relatively rich mixture in the auxiliary combustion chamber is first ignited by the ignition plug so that the combusting flame may be injected through the passage into the main combustion chamber, by which the lean fuel-air mixture in the main combustion chamber is ignited. Therefore, the internal combustion engines of this type is very effective for the combustion of the lean air-fuel mixture both in its ignitability and combustion speed. However, this engine has very distinct defects in that the fuel supply system is quite complicate because the rich and lean mixtures must be charged separately. For instance, the rich mixture is charged into the auxiliary combustion chamber from the auxiliary carburetor through an auxiliary intake valve. Therefore, three valves that is, the main intake valve, the auxiliary intake valve, and the exhaust valve must be mounted on one cylinder head. Since the intake systems of both the rich and lean mixtures must be provided separately, the construction of the cylinder head itself becomes very complex, and therefore difficult casting of the cylinder heads is required, resulting in poor productivity and increased cost. Furthermore the main carburetor for the lean mixture and the auxiliary carburetor for the rich mixture must be so controlled that a predetermined relation between the rich and lean mixtures must be correctly maintained or varied depending upon the operating conditions of the engine. Therefore, the members of, for instance, the linkage interconnecting the throttle valves of the main and auxiliary carburetors must be made with a higher degree of tolerance. Otherwise, the precise and simultaneous control on the main and auxiliary carburetors required on this engine becomes unobtainable. The fuel injection valve used to provide the rich mixture in the auxiliary combustion chamber usually causes the construction to become more complex, thus resulting in further increase in its cost.

SUMMARY OF THE INVENTION

The object of the present invention is to provide an internal combustion engine for a lean fuel-air mixture to reduce the harmful emissions from the exhaust gases, and providing both improved ignitability and thermal efficiency by increasing the combustion speed, and providing a simple construction by eliminating the dual fuel mixture system.

BRIEF DESCRIPTION OF THE DRAWING

Same reference numerals are used throughout the figures to designate similar parts.

DESCRIPTION OF THE PREFERRED EMBODIMENTS

Figure 1:
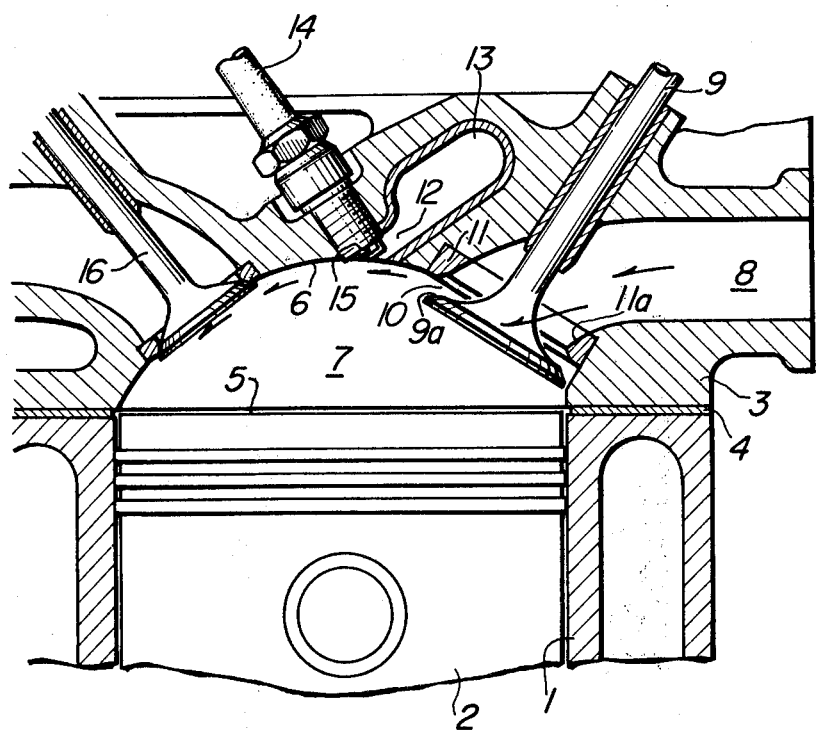
FIGS. 1 and 2 are schematic sectional views of first and second embodiments of the internal combustion engine in accordance with the present invention.

First Embodiment, FIG. 1

A first embodiment of the present invention will be described with reference to FIG. 1. Reference numeral 1 denotes an engine cylinder; 2, a piston; and 3, a cylinder head mounted upon the cylinder block through a gasket 4. A main combustion chamber 7 is defined by the inner surface 6 of the cylinder head 3 and the top surface 5 of the piston 2 at the top dead center. The inner surface 6 of the cylinder head 3 is of substantially semispherical shape or of a partial semi-sphere shape similar to the semispherical shape. The top surface 5 of the piston 2 is flat as shown in FIG. 1. An intake port 8 through which is charged a relatively lean mixture is formed through the cylinder head 3 and opens to the main combustion chamber 7 in such a way that an axis of the intake port 8 in the vicinity of its opening, i.e., in the vicinity of an intake valve 9, is directed toward the center of the cylinder 1. The axis of the intake valve 9 is also directed toward an axis of the cylinder 1. A portion 9a, which is closer to an apex of the main combustion chamber 7, of the valve face of the intake valve is disposed nearly tangential to the semispherical surface of the main combustion chamber, so that the main stream of the mixture flows, through a passage 10 defined between the portion 9a of the valve face closer to the apex of the main combustion chamber 7 and a valve seat 11, toward the apex of the main combustion chamber 7. The inner surface 11a of the valve seat 11 which is made of a sintered metal or the like and is disposed at the opening of the intake port 8 is smoothly connected to the inner surface of the intake port 8 so that the stream of the mixture may be prevented from being disturbed by the presence of the valve seat 11. The portion of the valve seat 11 remote from the apex of the main combustion chamber 7 is recessed outwardly from the inner surface 6 of the main combustion chamber 7 so that the mixture may be prevented from flaming into the main combustion chamber through the aperture between the inner side wall of the main combustion chamber in the vicinity of the portion of the valve seat 11 remote from the apex of the main combustion chamber and the edge of the intake valve 9. Therefore a substantial portion of the mixture is directed to flow through the main passage 10 into the main combustion chamber 7.

An auxiliary combustion chamber 13 formed in the vicinity of the apex of the main combustion chamber 7 is communicated through a passage 12 with the latter. The opening of the passage 12 at the inner surface 6 of the main combustion chamber 7 is directed toward the downstream of the swirls produced in the main combustion chamber as will be described in detail hereinafter. The spark electrodes 15 of an ignition plug 14 is located in the passage 12 in the vicinity of its opening into the main combustion chamber 7. Reference numeral 16 denotes an exhuast valve.

In the suction stroke of the engine, the piston 2 is lowered and the intake valve 9 is opened so that the relatively lean mixture is charged through the intake port 8 into the main combustion chamber 7. The charged lean mixture is forced to swirl in a vertical plane containing the axes of the cylinder 1 and the intake port 8 along the inner surface 6 as indicated by arrows in FIG. 1.

The reasons why such swirls of the mixture are formed are closely related to the shapes and configurations of the intake port, the intake valve and the combustion chamber, and some of them are attributed to the following facts;

1. that in the suction stroke the mixture flows at a very high speed through the intake port 8 so that it cannot completely follow the curvature of the intake port 8 because of its momentum, consequently forcing it to flow through the main passage 10;

2. that the stream of the mixture is slantingly impinged against the fillet portion of the intake valve 9 so that it is deflected forward the main passage 10;

3. that the opening of the main passage 10 is in the direction of the main stream of the fresh mixture so that the resistance in the main passage is very low while the portion of the valve seat 11 remote from the main passage 10 is recessed outwardly from the inner surface 6 of the cylinder head as described hereinbefore so that the passage between the recessed portion of the valve seat 11 and the intake valve 9 presents a high resistance to the flow of the incoming mixture; and 4. that because of the causes (1), (2), and (3), the flow of the mixture charged through the main passage 10 is forced to flow along the inner surface 6 of the main combustion chamber 7 due to the centrifugal effect, thus forming the intensive swirls along the inner surface 6.

Figure 3:
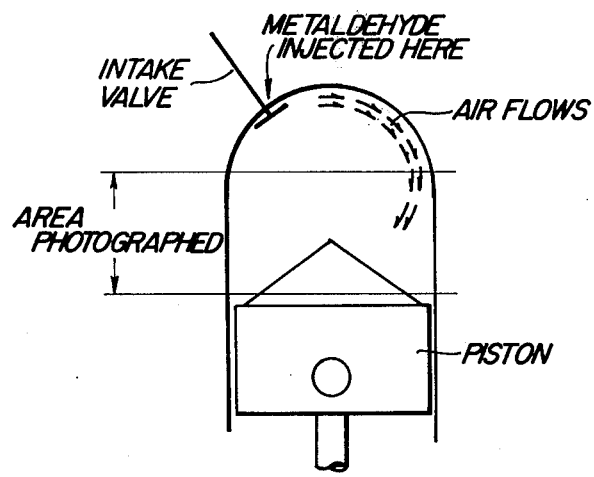
FIG. 3 is a schematic diagram of an experimental apparatus used in the experiments conducted by the inventor.
Figure 4:
FIGS. 4 and 5 are photographs showing the results of these experiments.
Figure 5:

Next, FIGS. 4 and 5, show the results of the preliminary experiments conducted by the inventor in order to develop the internal combustion engines in accordance with the present invention. The cylinder head and cylinder block used in this experiment were equal in dimension to those of the prototype engine and were made of acrylic resin. The piston was externally driven by a motor and the flow of the air within the cylinder was observed. For this purpose, metaldehyde $(CH_3CHO)_n$ where $n = 4$ or 6 was injected from a point upstream of the main passage 10 (See FIG. 1), and the photographs are taken as shown in FIGS. 4, and 5, in which the white portions indicate the flows of the injected metaldehyde representing air flow pattern. It is seen from the photographs that the white portions are centered along the cylinder wall of the opposite side of the intake valve. This results agree exactly with the swirling stream indicated by the arrows in FIG. 3.

The opening of the passage 12 intercommmunicating between the main and auxiliary combustion chambers 7 and 13, respectively, is directed toward the downstream of the mixture flowing along the inner surface 6 at high speed so that the residual gas remaining in the auxiliary combustion chamber 13 is sucked from the auxiliary combustion chamber 13 due to the ejector effect. This ejector effect would be weakened unless the opening of the passage 12 is located around the apex of the main combustion chamber where the intensive swirl exists locally. Therefore, it is essential to locate the opening of the passage 12 around the apex of the main combustion chamber 7, within the radius equal to one half of the diameter of the valve face 9a of the intake valve 9 from the apex of the main combustion chamber. A relatively rich mixture is formed along the inner surface 6 in the combustion chamber 7 due to the contrifugal force of the swirl, resulting in making the mixture, pushed through the passage 12 into the auxiliary combustion chamber 13, relatively rich. In other words, if the opening of the passage 12 was far apart from the apex of the main combustion chamber 7, the rich mixture would not be pushed into the auxiliary combustion chamber 13. Therefore, it is also essential to locate the center of the opening of the passage 12 around the apex of the main combustion chamber 7 within the radius equal to one half of the diameter of the valve face 9a of the intake valve 9 from the apex of the main combustion chamber. At the final stage of the compression stroke, the mixture still flowing in the passage 12 is ignited by the ignition plug 14. As described above, the residual gas in the auxiliary combustion chamber has been discharged therefrom in substantial quantity due to the ejector effect during the suction stroke. Remaining residual gases are pushed into the auxiliary combustion chamber 13 during the compression stroke by the fresh mixture entering passage 12. In addition, the mixture flow in the main combustion chamber 7 flows to the auxiliary combustion chamber 13 in the passage 12. Therefore, at the time of ignition there is no residual gas remaining in the passage 12 where the ignition plug 14 is located. Also, a relatively rich fresh mixture is charged into the passage from the main combustion chamber 7, so that the ignitability becomes remarkably improved. The combustion flame having a high temperature and pressure in the auxiliary combustion chamber is directed out through the passage 12 at extremely high speed into the main combustion chamber so that the relatively lean mixture in the main combustion chamber 7 may be immediately ignited by the flame, that is, by the torch effect described hereinbefore.

Figure 2:
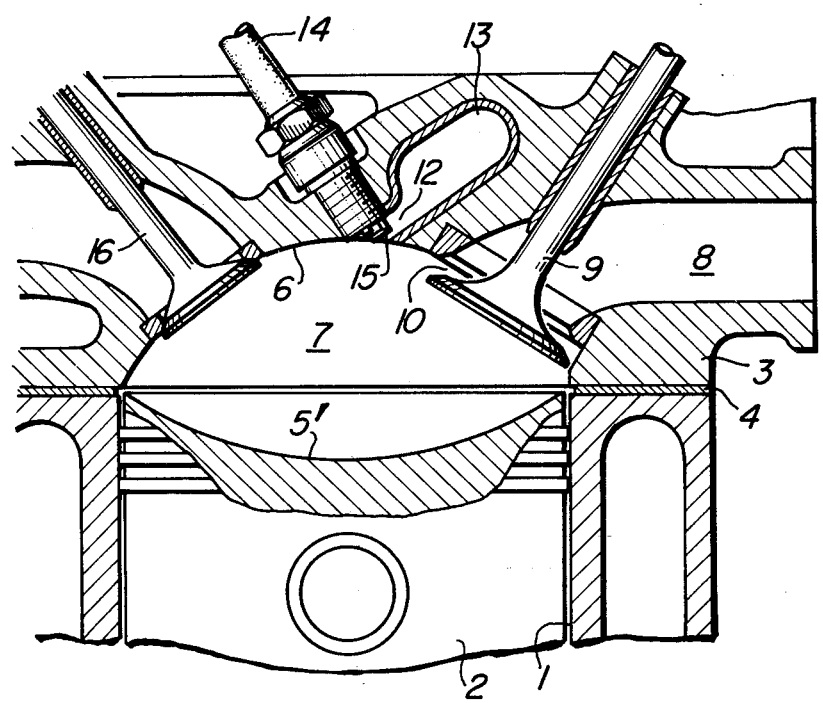

Second Embodiment, FIG. 2

The second embodiment as illustrated in FIG. 2 is substantially identical in structure with the first embodiment described above except that the top surface of the piston 2 is spherically concaved as designated by 5'. Because of the spherically concaved top surface of the piston 2, the swirls of mixture described above will not diminish until the succeeding compression stroke. Therefore, the effect of forming a relatively rich mixture by the centrifugal force due to swirling will become much larger when compared with the first embodiment.

As described hereinbefore, according to the present invention, the ignitability substantially equal to that attained with the stratified charge type internal combustion engine having an auxiliary combustion chamber may be easily attained, with the use of only a lean mixture, that is without using rich mixture. Thus, the present invention provides internal combustion engines which are inexpensive to manufacture, highly reliable in operation, and capable of reducing harmful emissions.

We claim:

1. An internal combustion engine comprising: cylinder means, piston means slidably disposed within said cylinder means, cylinder head means having a semispherical inner surface, a main combustion chamber defined by said semispherical surface of said cylinder head means and the top surface of said piston means, intake port means through which a homogeneous and relatively lean mixture flows into said main combustion chamber, an auxiliary combustion chamber confined in said cylinder head means, passage means communicating both said main and auxiliary chambers, an intake valve having a valve face for adjusting the opening degree of said intake port means, an axis of said intake valve means and a center line of said intake port means close to said intake valve being directed substantially toward the central portion of said cylinder means when extended, said valve face being inclined, at a portion near an apex of said semispherical surface, nearly tangential to said semispherical surface so as to permit a main stream of the mixture to flow along said semispherical surface, said passage means being opened to said main combustion chamber at a portion deviated from a central axis of said cylinder means by a distance less than a radius of said valve face, and an ignition plug having electrodes disposed near said opening portion of said passage means.

2. An internal combustion engine as defined in claim 1, wherein said intake port means extends substantially normal to the central axis of said cylinder means and has the inner end thereof curved toward the central portion of said cylinder means, and that portion of the valve face remote from the apex of the semispherical surface is recessed outwardly of the semispherical surface.

3. An internal combustion engine as defined in claim 1, wherein the opening of said passage means at said semispherical inner surface of said cylinder head means is directed toward the downstream of the main stream of the mixture flowing along said semispherical surface.

4. An internal combustion engine as defined in claim 1, wherein said main combustion chamber is defined between the semispherical surface of said cylinder head means and a flat end surface of the piston.

5. An internal combustion engine as defined in claim 1, wherein said main combustion chamber is defined between the semispherical surface of said cylinder head means and a concave semispherical surface of the piston.

6. An internal combustion engine as defined in claim 1, wherein the inner surface of said intake port means is smooth.

7. An internal combustion engine as defined in claim 6, further comprising valve seat means disposed at the opening of said intake port means, the inner surface of said valve seat means being smoothly connected to the inner surface of said intake port means.

8. An internal combustion engine comprising:
cylinder means,
piston means slidably disposed within said cylinder means,
a cylinder head means having a semi-spherical inner surface,
a main combustion chamber defined by said semi-spherical surface of said cylinder head means and the top surface of said piston means,
intake port means through which a homogeneous and relatively lean mixture flows into said main combustion chamber,
an auxiliary combustion chamber confined in said cylinder head means,
passage means communicating both said main and auxiliary chambers,
an intake valve having a valve face for adjusting the opening degree of said intake port means,
means for directing said homogeneous and relatively lean mixture along said semi-spherical surface past said passage means during a suction stroke of said engine, the flow of said mixture past said passage means sucking out from said passage means and said auxiliary combustion chamber residual burnt gases therein,
means for forcing a rich mixture into said passage means and said auxiliary chamber during the compression stroke of said engine, said rich mixture being formed along the inside periphery of said semi-spherical surface due to the relatively rapid flow of said lean mixture therealong, and
means for igniting said rich mixture in said passage means and said auxiliary combustion chamber to thereby generate a torch which is directed rapidly into said main combustion chamber to ignite the relatively lean mixture therein.

9. In an internal combustion engine comprising:
a cylinder means,
pistons means slidably disposed within said cylinder means,
cylinder head means having a semi-spherical inner surface,
a main combustion chamber defined by said semi-spherical surface of said cylinder head means and the top surface of said piston means,
intake port means through which a homogeneous and relatively lean air-fuel mixture can flow into said combustion chamber,
an auxiliary combustion chamber confined in said cylinder head means,
passage means communicating both said main and auxiliary chambers, said passage means being open to said main combustion chamber at a portion thereof positioned proximate the central axis of said cylinder, and
an intake valve having a valve face for adjusting the opening degree of said intake means,
the method of igniting a lean air-fuel mixture comprising the steps of:
introducing a homogeneous and relatively lean air-fuel mixture into said main combustion chamber,
directing said homogeneous and relatively lean air-fuel mixture along the semi-spherical surface of said main combustion chamber past said passage means,
sucking out of said passage means and said auxiliary combustion chamber residual burnt gases therein,
concentrating a relatively rich air-fuel mixture along the inside periphery of said semi-spherical surface due to the centrifugal forces generated on the air-fuel mixture when said air-fuel mixture passes along the semi-spherical surface of said main combustion chamber,
forcing said relatively rich air-fuel mixture into said passage means and said auxiliary combustion chamber,
generating a torch by igniting said relatively rich air-fuel mixture in said passage means and said auxiliary combustion chamber, and
igniting said lean air-fuel mixture by said generated torch.

* * * * *